United States Patent [19]

Craig

[11] 4,129,544

[45] Dec. 12, 1978

[54] AQUEOUS ACRYLIC COATING COMPOSITION FOR ELECTRICAL CONDUCTORS

[75] Inventor: John D. Craig, Medford Lakes, N.J.

[73] Assignee: E. I. Du Pont de Nemours and Company, Wilmington, Del.

[21] Appl. No.: 827,234

[22] Filed: Aug. 24, 1977

Related U.S. Application Data

[63] Continuation-in-part of Ser. No. 681,595, Apr. 29, 1976, abandoned.

[51] Int. Cl.$^2$ .................. C08L 61/10; C08L 33/24
[52] U.S. Cl. .................. 260/29.3; 204/181 C; 260/19 UA; 260/23 R; 260/29.6 NR; 260/29.6 RB; 260/29.6 WB; 260/29.6 T; 260/29.6 TA; 428/334; 428/460; 428/461
[58] Field of Search ...... 260/29.3, 29.6 NR, 29.6 TA, 260/29.6 T, 29.6 UB, 29.6 RB, 19 UA, 23 R; 428/334; 204/181

[56] References Cited

U.S. PATENT DOCUMENTS

| | | | |
|---|---|---|---|
| 2,787,561 | 4/1957 | Sanders | 260/29.3 X |
| 2,787,603 | 4/1957 | Sanders | 260/29.3 |
| 2,866,763 | 12/1958 | Sanders | 260/29.3 |
| 3,014,886 | 12/1961 | Harding | 260/29.3 X |
| 3,112,223 | 11/1963 | Logemann et al. | 260/29.6 TA X |
| 3,503,918 | 3/1970 | Le Sota | 260/29.7 |

*Primary Examiner*—Theodore E. Pertilla

[57] ABSTRACT

An aqueous coating composition for electrical conductors in which the film-forming constituents are (A) an acrylic polymer of acrylonitrile or methacrylonitrile, an alkyl acrylate such as butyl acrylate, methacrylic acid or acrylic acid, and an alkoxymethylacylamide such as N-(isobutoxymethyl) acrylamide, and (B) a phenol formaldehyde condensate; the composition is particularly useful for coating wires and other electrical conductors of aluminum, copper, aluminum alloys and the like.

15 Claims, No Drawings

AQUEOUS ACRYLIC COATING COMPOSITION FOR ELECTRICAL CONDUCTORS

CROSS REFERENCE TO RELATED APPLICATIONS

This application is a continuation-in-part of my copending application Ser. No. 681,595, filed Apr. 29, 1976 now abandoned.

BACKGROUND OF THE INVENTION

This invention relates to an aqueous coating composition and in particular to an aqueous acrylic coating composition or enamel for electrical conductors.

Conventional aqueous acrylic coating compositions or enamels are widely used to coat wires and other metallic conductors and in general form high quality coatings having good electrical properties. Examples of these enamels and processes for making them are shown in: Sanders U.S. Pat. No. 2,787,561 issued Apr. 2, 1957; Sanders No. 2,787,603 issued Apr. 2, 1957; Sanders No. 2,866,763 issued Dec. 30, 1958; Sanderson No. 3,032,521 issued May 1, 1962; Bullitt No. 3,069,375 issued Dec. 18, 1962; Fitch No. 3,104,231 issued Sept. 17, 1963; Victorius No. 3,206,421 issued Sept. 14, 1965 and Mesec No. 3,386,939 issued June 4, 1968.

A particular problem that occurs with these conventional enamels when used as coatings on wire for medium power transformers and distribution transformers is that the coatings have relatively poor high temperature dielectric strength and lose flexibility on aging. Surges of high voltages of electricity, for example, caused by lightning striking a transformer, cause a breakdown of these enamel coatings. Lightning striking a transformer causes wires used in the transformer to vibrate severely and if the coating on the wire is embrittled, the coating will shatter. Also, if the coatings' dielectric strength is insufficient, a breakdown will occur. There is a need for an enamel that has an improved dielectric strength particularly at elevated temperatures and will not embrittle on aging.

SUMMARY OF THE INVENTION

The aqueous coating composition has a solids content of about 5–50% of film-forming constituents; the film-forming constituents consist essentially of about (A) 60–95% by weight of a dispersed acrylic polymer consisting essentially of
  (1) acrylonitrile or methacrylonitrile;
  (2) an alkyl acrylate having 2–12 carbon atoms in the alkyl group;
  (3) methacrylic acid or acrylic acid; and
  (4) an (alkoxymethyl) acrylamide having 1–6 carbon atoms in the alkyloxy group;
wherein the acrylic polymer has a weight average molecular weight of at least 150,000; and (B) 5–40% by weight of a phenol formaldehyde condensate,
wherein the composition contains a sufficient amount of ammonia or an amine to provide a pH of about 7–9.5.

DESCRIPTION OF THE INVENTION

The aqueous coating composition of this invention has good dielectric properties and retains its flexibility on aging and when used as a coating on wires can withstand surges of high electrical voltage under elevated temperatures. Also, the coating has excellent resistance to the insulating liquids used in transformers.

The coating composition has a solids content of film-forming constituents of about 5–50% by weight. If the composition is applied to wire by a roller coating technique, the solids are adjusted to about 25–40% by weight and if a die is used to apply the composition to wires, the solids are adjusted to about 20–35% by weight. If the composition is electrodeposited, the solids are about 15–25% by weight. The remainder of the composition is an aqueous solution usually containing small amounts of diluents and solvents introduced during polymerization of the acrylic polymer or through other constituents added to the composition.

The film-forming constituents of the composition are of about 60–95% by weight of a dispersed acrylic polymer and about 5–40% by weight of a phenol formaldehyde condensate. For most applications, about 75–85% by weight of acrylic polymer and about 15–25% by weight of phenol formaldehyde condensate are used.

The acrylic polymer is of about 35–55% by weight of acrylonitrile or methacrylonitrile, 15–58% by weight of an alkyl acrylate having 2–12 carbon atoms in the alkyl group, 2–15% by weight of an acrylic acid or methacrylic acid and 5–15% by weight of an (alkoxymethyl) acrylamide that has 1–6 carbon atoms in the alkoxy group.

Typical alkyl acrylates that can be used in the acrylic polymer are ethyl acrylate, propyl acrylate, isopropylacrylate, butylacrylate, isobutylacrylate, pentyl acrylate, hexylacrylate, 2-ethylhexyl acrylate, nonyl acrylate, lauryl acrylate and the like. Generally butyl acrylate and 2-ethylhexyl acrylate are used since these monomers form an acrylic polymer that provide high quality enamels with good electrical properties.

Typical (alkoxymethyl) acrylamides that can be used are N-(methoxymethyl) acrylamide, N-(ethoxymethyl) acrylamide, N-(propoxymethyl) acrylamide, N-(butoxymethyl) acrylamide, N-(isobutoxymethyl) acrylamide, N-(pentoxymethyl) acrylamide and N-(hexaxymethyl) acrylamide. N-(isobutoxymethyl) acrylamide is preferred since acrylic polymers utilizing this constituent form coatings with good electrical properties and good resistance to conventional insulating liquids used in transformers.

Typically useful acrylic polymers are of about 40–50% by weight of acrylonitrile or methacrylonitrile, 35–42% of an alkyl acrylate having 2–8 carbon atoms in the alkyl group, 3–10% by weight of acrylic acid or methacrylic acid and 8–12% by weight of (alkoxymethyl) acrylamide.

One preferred acrylic which forms a good quality enamel with excellent physical and electrical properties is of about 45% by weight acrylonitrile, 40% by weight butyl acrylate, 5% by weight methacrylic acid and 10% by weight of N-(isobutoxymethyl) acrylamide.

Another useful acrylic polymer is of about 25–35% by weight of acrylonitrile or methacrylonitrile, 50–60% by weight of an alkyl acrylate having 2–12 carbon atoms in the alkyl group, 2–10% by weight of an acrylic acid or methacrylic acid and 5–15% by weight of an (alkoxymethyl) acrylamide that has 1–6 carbon atoms in the alkoxy group.

Another preferred acrylic which forms a good quality enamel with excellent physical and electrical properties is of about 30% by weight acrylonitrile, 55% by weight butyl acrylate, 5% by weight methacrylic acid and 10% by weight of N-(isobutoxymethyl) acrylamide.

The acrylic polymer is prepared by conventional emulsion polymerization techniques as shown in the aforementioned Sanders U.S. Pat. No. 2,866,763 and Sanderson No. 3,032,521. In preparing the polymer the monomers and conventional redox polymerization initiators such as ammonium persulfate, ferrous ammonium sulfate, sodium metabisulfate, potassium persulfate, and the like, are charged into a conventional polymerization vessel with water. Polymerization generally is conducted at about 80°-95° C. for about 1-4 hours to form an emulsion or dispersion in which the resulting polymer has a weight average molecular weight of at least 150,000. Generally, the polymer has a weight average molecular weight of about 300,000 to 3,000,000. Polymers having a molecular weight over 3,000,000 can also be used. Angular dependence light scattering or gel permeation chromatography can be used to determine the molecular weight.

The phenol formaldehyde condensate used in the composition is the conventional type used in aqueous compositions. The phenol formaldehyde condensate has a weight average molecular weight of about 100-2000 measured by gel permeation chromatography using polypropylene glycol as the standard. Usually, a phenol formaldehyde condensate is used that has a weight average molecular weight of about 150-1000.

It is possible to utilize the acrylic polymer dispersion as a coating composition without the addition of the phenol formaldehyde condensate. For some uses, the acrylic polymer dispersion forms an acceptable coating for conductors. This dispersion is applied by conventional techniques which will be discussed hereinafter.

The pH of the composition is about 7-9.5. Generally, a sufficient amount of ammonia or an amine is added to the composition to provide the above pH. For most applications the pH of the composition is about 8.0-9.5.

Typical amines that can be used are triethylamine, diethanolamine, ethanolamine, N-methylethanolamine, methyl diethanolamine, diethylene tetramine and the like.

Other additives can be incorporated into the composition such as about 0.5-5% by weight, based on the weight of the film-forming constituents, of a defoamer. Typical defoamers are of long chain fatty acid salts. Finely dispersed polyethylene in an amount of about 0.5-5% by weight, based on the weight of the film-forming constituents, also can be added. About 1-10% by weight based on the weight of the film-forming constituents, of a thickener such as a polyacrylic acid thickener can be added. Also, about 0.5-5% by weight, based on the weight of the film-forming constituents, of an alkylene glycol having 2-8 carbon atoms such as ethylene glycol or propylene glycol can be added. Conventional dyes and pigments can also be added to color the composition.

The composition is applied by conventional techniques to wire. In general, the wire is annealed and then coated in about 2 to 10 passes in a conventional wire coater either by roller coating or by die coating. The oven used in the wire coater has an inlet temperature of about 125°-175° C. and an outlet temperature of about 350°-600° C. The wire can be coated at about 5-150 feet per minute but coating speeds of about 30-50 feet per minute are usually used.

The composition can also be applied by conventional electrocoating procedures in which the metal article to be coated forms the anode of the cell. A voltage of about 50-250 volts and about 0.1-2 amps are used to deposit a coating. The article then is removed from the bath and baked for about 15-60 minutes at about 125°-300° C.

The composition can be used to coat all types of electrical conductors such as round wire, square or rectangular wire, bars, foils, strips, cylinders, etc. of aluminum, copper, aluminum alloys and other metals. The coatings on these conductors are about 0.1-5.0 mils thick but for most uses the coatings are about 1-3.5 mils thick.

Wires coated with the composition are usually used in medium power or distribution transformers. These transformers are filled with an insulating liquid such as hydrocarbon oils, silicone oils, perchloro phenols and the like. The coatings are resistant to these insulating liquids.

The following examples illustrate the invention. All parts, ratios and percentages are on a weight basis unless otherwise indicated.

EXAMPLE 1

An aqueous polymer dispersion is prepared as follows:

|  | Parts by Weight |
|---|---|
| PORTION 1 | |
| Deionized water | 1027.0 |
| Acrylonitrile monomer | 41.0 |
| Butyl acrylate monomer | 36.0 |
| Methacrylic acid monomer | 4.5 |
| N-(isobutoxymethyl) acrylamide monomer | 9.0 |
| PORTION 2 | |
| Deionized water | 36.0 |
| Ferrous ammonium sulfate | 0.012 |
| PORTION 3 | |
| Acrylonitrile monomer | 368.0 |
| Butylacrylate monomer | 328.0 |
| PORTION 3 | |
| Methacrylic acid monomer | 41.0 |
| N-(isobutoxymethyl) acrylamide monomer | 82.0 |
| PORTION 4 | |
| Deionized water | 300.0 |
| Ammonium persulfate | 2.49 |
| Sodium metabisulfate | 0.78 |

Portion 1 is charged into a polymerization vessel equipped with a stirrer, reflux condenser, thermometer, a heating mantle and a nitrogen gas inlet. Nitrogen gas is then blown into the vessel to cover the above constituents charged into the vessel. The reaction mixture in the vessel is constantly being agitated during polymerization. Portion 1 is heated to about 80° C. in about 35 minutes, and Portion 2 is added. Then one-half of Portion 4 is added. The second half of Portion 4 and Portion 3 are added simultaneously over a 30 minute period while maintaining the temperature at about 80° C. which causes a slight reflux of the reaction mixture. After Portion 3 and Portion 4 are added the reaction mixture is brought to full reflux for about one hour. When the exothermic reaction subsides, the reaction mixture is held at about 80° C. for about one hour and then cooled and filtered to remove any coagulum.

The resulting aqueous dispersion has a polymer solids content of about 37%. The polymer is of acrylonitrile/butyl acrylate/methacrylic acid/N-(isobutoxymethyl) acrylamide in a weight ratio of 45/40/5/10. The polymer has a weight average molecular weight of about 1,000,000 determined by angular dependence light scattering.

A wire enamel is prepared by blending together the following ingredients:

|  | Parts by Weight |
|---|---|
| PORTION 1 | |
| Aqueous polymer dispersion (prepared above) | 446.4 |
| Defoamer (water dispersible long chain fatty acid salt) | 5.1 |
| Deionized water | 103.2 |
| Propylene glycol | 20.8 |
| Aqueous ammonia solution (50% ammonia) | 3.9 |
| PORTION 2 | |
| Phenol formaldehyde condensate solution (64% solids in water of phenol formaldehyde condensate having a weight average molecular weight of about 150–500 determined by gel permeation chromatography using a polypropylene glycol as the standard.) | 63.1 |
| Acrylic acid thickener solution (11.4 parts polyacrylic acid containing crosslinked acrylic constituents in 27.9 parts water) | 39.3 |
| Aqueous ammonia solution (50% ammonia) | 12.1 |
| TOTAL | 693.9 |

Portion 1 is throughly mixed in a mixing vessel and then Portion 2 is added and thoroughly mixed to form an aqueous wire enamel having a solids content of about 29% and a pH of about 8.

The wire enamel is coated onto a No. 18 gauge copper wire using a conventional wire coater. The wire is first annealed at 427° C. and then at a coating speed of 35 feet per minute is run through a conventional die which applies the enamel then passed into a vertical oven having an inlet temperature of about 150° C. and an outlet temperature of 427° C. The wire is passed through the die and through the oven six times. The resulting wire is coated with about a 3.0 mil thick coating.

The following tests are conducted on the resulting coated wire:

| Flexibility | - 4X |
|---|---|
| Dielectric strength at | |
| 25° C | - 9.8KV |
| 155° C | - 5.2KV |
| 175° C | - 5.0KV |
| Cut through resistance | - 365° C |
| Dissipation factor | |
| 100 Hertz (25° C) | - 2.6% |
| 1000 Hertz (155° C) | - 44% |
| Unilateral scrape | - 1814 |
| Overload figure of merit | - 2.8 |

Flexibility test — The coated wire is stretched to its breaking point and is wrapped around itself ten turns and the coating is examined for breaks. If there are no breaks, the rating is 1X. If a break in the coating occurs, the wire is wrapped around larger mandrels until there are no breaks in the coating. For example, a rating of 2X means that the wire can be wrapped around a mandrel that is twice the diameter of the wire without breaking the coating.

Dielectric Strength Test — NEMA Test 53.1 described in NEMA Standards Publication No. MW 1000-1973 ANSI C9.100-1973 published by National Electrical Manufacturers Association, 155 East 44th Street, New York N.Y. 10017.

Cut Through Resistance Test — Coated wire is crossed and is weighted with a 2000 g weight and the wire is heated until coating is cut through. This is indicated by a short circuit in the wire. The temperature at which the coating of the wire is cut through is cut through resistance temperature.

Dissipation Factor — NEMA Test 9.2.1.2.1.
Unilateral Scrape — NEMA Test 5.1.1.2.
Overload Figure of Merit — NEMA Test 53.1

EXAMPLE 2

An aqueous coating composition is prepared by blending together the following constituents:

|  | Parts by Weight |
|---|---|
| Aqueous polymer dispersion (same as Example 1 except polymer solids is about 32%) | 84.2 |
| Defoamer (described in Example 1) | 0.5 |
| Deionized water | 3.2 |
| Phenol formaldehyde condensate solution (described in Example 1) | 12.1 |
| Total | 100.0 |

A film is cast on a glass plate from the above composition and baked at 200° C. for about 15 minutes. The resulting film is about 1.5 mils thick. The dissipation factor is measured as in Example 1 and is as follows:
1000 Hertz (25° C.) 0.52%
100 Hertz (25° C.) 5.3%

EXAMPLE 3

The following wire enamels are prepared as in Example 1:

| Wire Enamel | Parts by Weight | | |
|---|---|---|---|
|  | A | B | C |
| Aqueous Polymer Dispersion | Example 1 Dispersion Except solids at 32.5% solids 86.0 | Example 1 Dispersion 93.6 | Aqueous* Disperison of AN/2EHA/ AA/IBMA 86.4 |
| Defoamer (Described in Example 1) | 0.5 | 0.5 | 0.4 |
| Deionized Water | — | — | 0.7 |
| Phenol formaldehyde condensate solution (described in Example 1) | 10.6 | 5.1 | 12.1 |
| Aqueous ammonia solution (50% ammonia) | 0.8 | 0.8 | 0.3 |
| Acrylic polymer to phenol formaldehyde condensate weight ratio | 80:20 | 90:10 | 80:20 |

*Aqueous dispersion having a solids content of 37% of a polymer of acrylonitrile/2-ethylhexyl acrylate/acrylic acid/N-(isobutoxymethyl) acrylamide in a weight ratio of 50/35/5/10 prepared according to the process described in Example 1.

Each of the above wire enamels A–C is coated onto a No. 18 gauge copper wire using the same equipment and procedure as in Example 1. Each of the wires is tested as in Example 1 and the results of these tests are as follows:

| Wire Enamel: | A | B | C |
|---|---|---|---|
| Film Thickness (mils) | 3.0 | 3.0 | 3.0 |
| Flexibility | 4x | 1x | 8x |
| Dielectric strength | | | |
| 25° C | 9.8 Kv | 11.6 Kv | 10.4 Kv |
| 155° C | 5.2 Kv | 4.5 Kv | 6.6 Kv |
| 175° C | 5.0 Kv | — | 4.2 Kv |
| Cut through resistance | 365° C | 341° C | 335° C |

-continued

| Wire Enamel: | A | B | C |
|---|---|---|---|
| Dissipation factor | | | |
| 1000 Hertz (25° C) | 2.6% | 2.7% | 3.7% |
| 1000 Hertz (155° C) | 44% | 78% | 50% |
| Unilateral scrape | 1814 | 1484 | 1165 |
| Overload figure of merit | 2.8 | 2.3 | — |

The results of these tests indicate that enamels A, B and C have a high dielectric strength at elevated temperatures which is an important property for wires used in transformers. The other test results show that all the enamels have acceptable properties.

EXAMPLE 4

The following two enamels are prepared without the phenol formaldehyde condensate:

| | Parts by Weight | |
|---|---|---|
| Wire Enamel | D | E |
| Aqueous polymer dispersion | Example 1 polymer dispersion 55.3 | **Aqueous dispersion of AN/BA/MAA 51.2 |
| Defoamer (described in Example 1) | 0.2 | 0.2 |
| Deionized water | 38.6 | 44.5 |
| Ethylene glycol monoethylether | 3.0 | 1.5 |
| Aqueous ammonia solution (50% ammonia) | 2.9 | 2.6 |

**Aqueous dispersion having a 42% solids content of a polymer of acrylonitrile/butylacrylate/methacrylic acid in a weight ratio of 50/45/5 prepared according to the process of Sanderson U.S. 3,032,521 mentioned above.

Each of the above wire enamels D and E is coated onto a No. 18 gauge copper wire using the same equipment and procedure as in Example 1. Each of the coated wires is tested as in Example 1 and the results of these tests are as follows:

| Wire Enamel | D | E |
|---|---|---|
| Film thickness (mils) | 2.8 | 3.0 |
| Flexibility | 1x | 1x |
| Dielectric strength | | |
| 25° C | 9.9 Kv | 8 Kv |
| 155° C | 4.1 Kv | 2.5 Kv |
| Cut through resistance | 226° C | 160° C |
| Dissipation factor | | |
| 1000 Hertz (25° C) | 2.7% | 3.0% |
| 1000 Hertz (155° C) | +99% | +99% |
| Unilateral Scrape | 1351 | 1100 |
| Overload figure of merit | 0.5 | 0.5 |

The above tests show that the dielectric strength at elevated temperatures of Wire Enamel D is substantially better than Wire Enamel E which is representative of a previously used wire enamel. Cut through resistance of Wire Enamel D is also better than Wire Enamel E. The other properties of the two wire enamels are about the same.

EXAMPLE 5

A wire enamel suitable for electrodeposition is prepared by blending together the following constituents:

| | Parts by Weight |
|---|---|
| Aqueous polymer Dispersion (described in Example 1) | 35.1 |
| Deionized water | 15.1 |
| Ethylene glycol monoethyl ether | 24.7 |
| Ethylene glycol monobutyl ether | 14.5 |
| Phenol formaldehyde condensate solution (described in Example 1) | 10.6 |
| Total | 100.0 |

The ratio of acrylic polymer to phenol formaldehyde is about 70:30.

The above prepared enamel is charged into a standard anodic electrocoating cell and 4×6 inch aluminum panels are immersed in the cell and electrocoated for about 5 seconds, using about 75 volts and 0.4 amps. The resulting coated panels are baked for about 60 minutes at 150° C. The resulting coating is about 0.5 mils thick and has a dielectric strength at 25° C. of a 3 Kv per mil and at 155° C., 1.5 Kv per mil.

EXAMPLE 6

A Wire Enamel F is prepared which is representative of a conventional wire enamel.

Wire Enamel F is prepared using Wire Enamel E of Example 4. Sufficient phenol formaldehyde condensate solution (described in Example 1) is added to Wire Enamel E to give an acrylic polymer to phenol formaldehyde condensate ratio of 83:17.

Wire Enamel G is prepared which is representative of this invention. The wire enamel of Example 1 is used except the ratio of acrylic polymer to phenol formaldehyde condensate is adjusted to a ratio of 83:17.

Films about 3 mils thick are prepared from each of the above enamels. The dielectric constant, measured according to ASTM D-150, dissipation factor measured at 50 Herz and volume resistivity measured according to ASTM D-257, are determined for each of the wire enamels. These measurements are made at the following times after the films are exposed to nitrogen at 100° C.:

| Hours Exposure to $N_2$ at 100° C | Dielectric Constant | | Dissipation Factor (%) | | Volume Resistivity (OHMS/Meter) | |
|---|---|---|---|---|---|---|
| | Wire Enamel F | Wire Enamel G | Wire Enamel F | Wire Enamel G | Wire Enamel F ($\times 10^6$) | Wire Enamel G ($\times 10^8$) |
| 1 | 32.81 | — | 118.26 | — | 9.27 | — |
| 4 | 32.81 | — | 152.17 | — | 7.20 | — |
| 5 | — | 15.25 | — | 10.61 | — | 2.22 |
| 7 | 31.38 | — | 150.00 | — | 7.64 | — |
| 23 | — | 15.58 | — | 9.95 | — | 2.32 |
| 24 | 28.82 | — | 148.51 | — | 8.40 | — |
| 32 | 27.82 | — | 149.74 | — | 8.63 | — |
| 48 | 26.92 | 14.91 | 139.15 | 9.94 | 9.58 | 2.43 |
| 70 | — | 15.25 | — | 9.39 | — | 2.51 |
| 72 | 26.52 | — | 138.04 | — | 9.92 | — |

-continued

| Hours Exposure to N₂ at 100°C | Dielectric Constant | | Dissipation Factor (%) | | Volume Resistivity (OHMS/Meter) | |
|---|---|---|---|---|---|---|
| | Wire Enamel F | Wire Enamel G | Wire Enamel F | Wire Enamel G | Wire Enamel F ($\times 10^6$) | Wire Enamel G ($\times 10^8$) |
| 102 | — | 15.25 | — | 9.33 | — | 2.53 |
| 144 | 24.82 | — | 114.94 | — | 12.60 | — |
| 166 | — | 14.82 | — | 9.43 | — | 2.57 |
| 168 | 25.25 | — | 111.18 | — | 13.30 | — |
| 190 | — | 14.48 | — | 9.53 | — | 2.60 |
| 192 | 24.11 | — | 112.43 | — | 13.30 | — |
| 214 | — | 14.65 | — | 9.31 | — | 2.64 |
| 216 | 22.11 | — | 116.13 | — | 14.00 | — |
| 238 | — | 14.57 | — | 9.24 | — | 2.67 |
| 241 | 22.82 | — | 109.38 | — | 14.40 | — |
| 263 | — | 14.48 | — | 9.24 | — | 2.69 |
| 264 | — | 14.40 | — | 9.29 | — | 2.69 |
| 318 | 23.25 | — | 98.77 | — | 15.70 | — |

The dielectric constant of Wire Enamel G decreased only slightly on heat aging while the dielectric constant of Wire Enamel F which represents the prior art decreased by about 1/3. The dissipation factor only decreased slightly with Enamel G but a significant decrease was noted with Enamel F. Volume resistivity increased only slightly with Enamel G but significantly with Enamel F.

EXAMPLE 7

An aqueous polymer dispersion is prepared as follows:

| | Parts by Weight |
|---|---|
| PORTION 1 | |
| Deionized water | 1027.0 |
| Acrylonitrile monomer | 27.3 |
| Butyl acrylate monomer | 49.5 |
| Methacrylic acid monomer | 4.5 |
| N-(isobutoxymethyl) acrylamide monomer | 9.0 |
| PORTION 2 | |
| Deionized water | 36.0 |
| Ferrous ammonium sulfate | 0.012 |
| PORTION 3 | |
| Acrylonitrile monomer | 245.3 |
| Butylacrylate monomer | 451.0 |
| PORTION 3 | |
| Methacrylic acid monomer | 41.0 |
| N-(isobutoxymethyl) acrylamide monomer | 82.0 |
| PORTION 4 | |
| Deionized water | 300.0 |
| Ammonium persulfate | 2.49 |
| Sodium metabisulfate | 0.78 |

Portion 1 is charged into a polymerization vessel equipped with a stirrer, reflux condenser, thermometer, a heating mantle and a nitrogen gas inlet. Nitrogen gas is then blown into the vessel to cover the above constituents charged into the vessel. The reaction mixture in the vessel is constantly being agitated during polymerization. Portion 1 is heated to about 80° C. in about 35 minutes, and Portion 2 is added. Then one-half of Portion 4 is added. The second half of Portion 4 and Portion 3 are added simultaneously over a 30 minute period while maintaining the temperature at about 80° C. which causes a slight reflux of the reaction mixture. After Portion 3 and Portion 4 are added the reaction mixture is brought to full reflux for about one hour. When the exothermic reaction subsides, the reaction mixture is held at about 80° C. for about one hour and then cooled and filtered to remove any coagulum.

The resulting aqueous dispersion has a polymer solids content of about 37%. The polymer is of acrylonitrile/butyl acrylate/methacrylic acid/N-(isobutoxymethyl) acrylamide in a weight ratio of 30/55/5/10. The polymer has a weight average molecular weight of about 1,000,000 determined by angular dependence light scattering.

A wire enamel is prepared by blending together the following ingredients:

| | Parts by Weight |
|---|---|
| PORTION 1 | |
| Aqueous polymer dispersion (prepared above) | 446.4 |
| Defoamer (water dispersible long chain fatty acid salt) | 5.1 |
| Deionized water | 103.2 |
| Propylene glycol | 20.8 |
| Aqueous ammonia solution (50% ammonia) | 3.9 |
| PORTION 2 | |
| Phenol formaldehyde condensate solution (described in Example 1) | 63.1 |
| Acrylic acid thickener solution (described in Example 1) | 39.3 |
| Aqueous ammonia solution (50% ammonia) | 12.1 |
| TOTAL | 693.9 |

Portion 1 is thoroughly mixed in a mixing vessel and then Portion 2 is added and thoroughly mixed to form an aqueous wire enamel having a solids content of about 29% and a pH of about 8.

The wire enamel is coated onto a No. 18 gauge copper wire using the same equipment and procedure as in Example 1. The resulting wire is coated with about a 3.0 mil thick coating.

The following tests (described in Example 1) are conducted on the coated wire and the results of these tests are as follows:

| | |
|---|---|
| Flexibility | 2X |
| Dielectric strength at 25° C | 9.9 KV |
| Cut through resistance | 340° C |
| Dissipation factor 1000 Hertz (25° C) | 2.5% |
| Overload figure of merit | 2.9 |

I claim:
1. An aqueous coating composition having a solids content of about 5-50% of film forming constituents; wherein the film forming constituents consist essentially of about
   (A) 60-95% by weight of a dispersed acrylic polymer consisting essentially of about
      (1) 35-55% by weight, based on the weight of the acrylic polymer, of acrylonitrile or methacrylonitrile;

(2) 15-58% by weight, based on the weight of the acrylic polymer, of an alkyl acrylate having 2-12 carbon atoms in the alkyl group;
(3) 2-15% by weight, based on the weight of the acrylic polymer, of methacrylic acid or acrylic acid; and
(4) 5-15% by weight, based on the weight of the acrylic polymer, of an (alkoxymethyl) acrylamide having 1-6 carbon atoms in the alkoxy group; wherein the acrylic polymer has a weight average molecular weight of at least 150,000; and
(B) 5-40% by weight of a phenol formaldehyde condensate; having a weight average molecular weight of about 100-2000 measured by gel permeation chromatography; wherein the composition contains a sufficient amount of ammonia or an amine to provide a pH of about 7-9.5.

2. The coating composition of claim 1 in which the acrylic polymer consists essentially of about 40-50% by weight of acrylonitrile or methacrylonitrile, 35-42% by weight of an alkyl acrylate having 2-8 carbon atoms in the alkyl group 3-10% by weight of acrylic acid or methacrylic acid and 8-12% by weight of N-(butoxymethyl) acrylamide.

3. The coating composition of claim 2 in which the acrylic polymer consists essentially of about 45% by weight acrylonitrile, 40% by weight butyl acrylate, 5% by weight of methacrylic acid and 10% by weight N-(isobutoxymethyl) acrylamide.

4. The aqueous coating composition of claim 1 in which the film forming constituents consist essentially of about
(A) 75-85% by weight of an acrylic polymer consisting essentially of about
(1) 45% by weight of acrylonitrile,
(2) 40% by weight of butylacrylate,
(3) 5% by weight of methacrylic acid and
(4) 10% by weight of N-(isobutoxymethyl) acrylamide wherein the acrylic polymer has a weight average molecular weight of about 300,000 to 3,000,000,
(B) 15-25% by weight of phenol formaldehyde condensate having a weight average molecular weight of about 150-1000 measured by gel permeation chromatography; and
wherein the composition contains sufficient ammonia to provide a pH of about 8.0-9.5.

5. The coating composition of claim 1 containing in addition to the film forming constituents about 0.5-5% by weight, based on the weight of the film-forming constituents of an alkylene glycol having 2-8 carbon atoms.

6. The coating composition of claim 1 containing in addition to the film-forming constituents about 0.5-5% by weight of a defoamer of a long chain fatty acid salt.

7. The coating composition of claim 1 containing in addition to the film-forming constituents about 1-10% by weight of a polyacrylic acid thickener.

8. An aqueous coating composition having a solids content of about 5-50% of film forming constituents; wherein the film forming constituents consist essentially of about
(A) 60-95% by weight of a dispersed acrylic polymer consisting essentially of about
(1) 25-35% by weight, based on the weight of the acrylic polymer, of acrylonitrile or methacrylonitrile;
(2) 50-60% by weight, based on the weight of the acrylic polymer, of an alkyl acrylate having 2-12 carbon atoms in the alkyl group;
(3) 2-10% by weight, based on the weight of the acrylic polymer, of methacrylic acid or acrylic acid; and
(4) 5-15% by weight, based on the weight of the acrylic polymer, of N-(butoxymethyl) acrylamide wherein the acrylic polymer has a weight average molecular weight of at least 150,000; and
(B) 5-40% by weight of a phenol formaldehyde condensate having a weight average molecular weight of about 100-2000 measured by gel permeation chromatography; wherein the composition contains a sufficient amount of ammonia or an amine to provide a pH of about 7-9.5.

9. The coating composition of claim 8 in which the acrylic polymer consists essentially of about 30% by weight acrylonitrile, 55% by weight butyl acrylate, 5% by weight of methacrylic acid and 10% by weight N-(isobutoxymethyl) acrylamide.

10. The aqueous coating composition of claim 9 in which the film forming constituents consist essentially of about
(A) 75-85% by weight of an acrylic polymer consisting essentially of about
(1) 30% by weight of acrylonitrile,
(2) 55% by weight of butyl acrylate,
(3) 5% by weight of methacrylic acid and
(4) 10% by weight of N-(isobutoxymethyl) acrylamide wherein the acrylic polymer has a weight average molecular weight of about 300,000 to 3,000,000,
(B) 15-25% by weight phenol formaldehyde condensate having a weight average molecular weight of about 150-1000 measured by gel permeation chromatography; and
wherein the composition contains sufficient ammonia to provide a pH of about 8.0-9.5.

11. An aqueous coating composition having a solids content of about 5-50% of film forming constituents which consist essentially of a dispersed acrylic polymer consisting essentially of about
(1) 35-55% by weight, based on the weight of the acrylic polymer, of acrylonitrile or methacrylonitrile;
(2) 15-58% by weight, based on the weight of the acrylic polymer, of an alkyl acrylate having 2-12 carbon atoms in the alkyl group;
(3) 2-15% by weight, based on the weight of the acrylic polymer, of methacrylic acid or acrylic acid; and
(4) 5-15% by weight, based on the weight of the acrylic polymer of an (alkoxymethyl) acrylamide having 1-6 carbon atoms in the alkoxy group; wherein the acrylic polymer has a weight average molecular weight of at least 150,000; and
wherein the composition contains a sufficient amount of ammonia or an amine to provide a pH of about 7-9.5.

12. The coating composition of claim 11 in which the acrylic polymer consists essentially of about 40-50% by weight of acrylonitrile or methacrylonitrile, 35-42% by weight of an alkyl acrylate having 2-8 carbon atoms in the alkyl group, 3-10% by weight of acrylic acid or methacrylic acid and 8-12% by weight of N-(butoxymethyl) acrylamide.

13. The coating composition of claim 12 in which the acrylic polymer consists essentially of about 45% by weight acrylonitrile, 40% by weight butyl acrylate, 5% by weight of methacrylic acid and 10% by weight N-(isobutoxymethyl) acrylamide.

14. An aqueous coating composition having a solids content of about 5–50% of film-forming constitutents which consist essentially of a dispersed acrylic polymer consisting essentially of about
   (1) 25–35% by weight, based on the weight of the acrylic polymer, of acrylonitrile or methacrylonitrile;
   (2) 50–60% by weight, based on the weight of the acrylic polymer, of an alkyl acrylate having 2–12 carbon atoms in the alkyl group;
   (3) 2–10% by weight, based on the weight of the acrylic polymer, of methacrylic acid or acrylic acid; and
   (4) 5–15% by weight, based on the weight of the acrylic polymer, of N-(butoxymethyl) acrylamide;
   wherein the acrylic polymer has a weight average molecular weight of at least 150,000; and
   wherein the composition contains a sufficient amount of ammonia or an amine to provide a pH of about 7–9.5.

15. The coating composition of claim 14 in which the acrylic polymer consists essentially of about 30% by weight acrylonitrile, 55% by weight butyl acrylate, 5% by weight of methacrylic acid and 10% by weight N-(isobutoxymethyl) acrylamide.

* * * * *